(12) United States Patent
Chen

(10) Patent No.: US 11,982,911 B2
(45) Date of Patent: May 14, 2024

(54) DISPLAY PANEL AND PREPARING METHOD THEREOF

(71) Applicant: SHENZHEN CHINA STAR OPTOELECTRONICS SEMICONDUCTOR DISPLAY TECHNOLOGY CO., LTD., Shenzhen (CN)

(72) Inventor: Fangfu Chen, Shenzhen (CN)

(73) Assignee: SHENZHEN CHINA STAR OPTOELECTRONICS SEMICONDUCTOR DISPLAY TECHNOLOGY CO., LTD., Shenzhen (CN)

(*) Notice: Subject to any disclaimer, the term of this patent is extended or adjusted under 35 U.S.C. 154(b) by 355 days.

(21) Appl. No.: 17/427,056

(22) PCT Filed: May 31, 2021

(86) PCT No.: PCT/CN2021/097299
§ 371 (c)(1),
(2) Date: Jul. 29, 2021

(87) PCT Pub. No.: WO2022/142119
PCT Pub. Date: Jul. 7, 2022

(65) Prior Publication Data
US 2023/0367160 A1   Nov. 16, 2023

(30) Foreign Application Priority Data
Jan. 4, 2021 (CN) .................. 202110004087.X

(51) Int. Cl.
*G02F 1/1362*   (2006.01)
*G02F 1/1368*   (2006.01)

(52) U.S. Cl.
CPC ...... *G02F 1/136227* (2013.01); *G02F 1/1368* (2013.01)

(58) Field of Classification Search
None
See application file for complete search history.

(56) References Cited

U.S. PATENT DOCUMENTS

| | | | |
|---|---|---|---|
| 6,271,600 B1 * | 8/2001 | Inada | H01L 23/5382 257/784 |
| 10,048,552 B2 * | 8/2018 | Nishino | G02F 1/136204 |

(Continued)

FOREIGN PATENT DOCUMENTS

| | | |
|---|---|---|
| CN | 102956672 A | 3/2013 |
| CN | 104076567 A | 10/2014 |

(Continued)

OTHER PUBLICATIONS

Chinese Office Action issued in corresponding Chinese Patent Application No. 202110004087.X dated Apr. 15, 2022, pp. 1-6.

(Continued)

*Primary Examiner* — Ryan Crockett
(74) *Attorney, Agent, or Firm* — PV IP PC; Wei Te Chung; Zhigang Ma

(57) ABSTRACT

A display panel and a preparing method thereof are provided. The display panel has a second wire between a first insulating layer and a second insulating layer, so that a first wire and a bridging wire are connected through the second wire to avoid a stepped angle between the first insulating layer and the second insulating layer due to etching problems, thereby preventing the bridging wire from poor contact, so that the connection between the first wire and a third wire is more stable.

8 Claims, 5 Drawing Sheets

(56) References Cited

U.S. PATENT DOCUMENTS

| | | | | | |
|---|---|---|---|---|---|
| 2002/0008799 | A1* | 1/2002 | Ota | .................. | G09G 3/3648 |
| | | | | | 349/43 |
| 2005/0134756 | A1* | 6/2005 | Yang | ............... | G02F 1/136227 |
| | | | | | 349/43 |
| 2013/0286341 | A1* | 10/2013 | Zhang | ................ | G02F 1/1309 |
| | | | | | 445/24 |

FOREIGN PATENT DOCUMENTS

| | | | | | |
|---|---|---|---|---|---|
| CN | 105742296 | A | | 7/2016 | |
| CN | 106125437 | A | * | 11/2016 | ....... G02F 1/136227 |
| CN | 106125437 | A | | 11/2016 | |
| CN | 110349973 | A | | 10/2019 | |
| CN | 110429088 | A | | 11/2019 | |
| CN | 112612164 | A | | 4/2021 | |

OTHER PUBLICATIONS

Notification to Grant Patent Right for Invention issued in corresponding Chinese Patent Application No. 202110004087.X dated Jun. 29, 2022, pp. 1-4.
International Search Report in International application No. PCT/CN2021/097299, dated Jun. 24, 2021.
Written Opinion of the International Searching Authority in International application No. PCT/CN2021/097299, dated Jun. 24, 2021.

* cited by examiner

DISPLAY PANEL AND PREPARING METHOD THEREOF

CROSS-REFERENCE TO RELATED APPLICATIONS

This application is a Notional Phase of PCT Patent Application No. PCT/CN2021/097299 having international filing date of May 31, 2021, which claims priority from China Application Ser. No. 202110004087.X, filed on Jan. 4, 2021 in China National Intellectual Property Administration, and entitled "DISPLAY PANEL AND PREPARING METHOD THEREOF", all of which are hereby incorporated by reference in their entirety.

FIELD OF INVENTION

The present disclosure relates to a technical field of display devices, and specifically, to a display panel and a preparing method thereof.

BACKGROUND OF INVENTION

With the development and popularization of new technology products with 4K and 8K ultra-resolution and ultra-narrow bezels (bezel width less than or equal to 0.9 mm) of LCD panels, traditional panel designs can no longer meet high-specification requirements. In order to meet the ultra-narrow bezel and high-resolution specifications, the industry is developing row drivers to be installed on the source bezel of the display panel (GOA in Source Board) and the gate line flexible circuit board to be installed on the source bezel of the display panel (Gate COF in Source Board), so that the widths of the gate bezel and bottom bezel of the display panel can achieve a requirement of 0.9 mm.

In order to meet the capabilities of existing process tools for the development of this technology, as shown in FIG. 1, the product design usually requires vertical gate lines (V-Gate) 1 to be connected to fanout lines through transition holes 4 and transition lines 3, and then connected to the COF boot device through the fanout lines 2. As shown in FIG. 2, the current ultra-narrow bezel requires the use of three-layer metal circuit technology, and two layers of the gate insulating layers 5 and 6. If the transition hole for the vertical gate line 1 and the fanout line 2 is formed by the current etching technology, since the transition hole is formed by the two insulating layers, a stepped angle as shown in the dashed box in FIG. 2 appears on the inner sidewall of the hole, so that the transition line 3 is prone to problems, such as poor contact upon connection.

SUMMARY OF DISCLOSURE

Technical Problem

An object of the present disclosure is to provide a display panel and a preparing method of the display panel, in order to solve the problem existing in the current technology that a stepped angle is presented on a side wall of a transition hole when the transition hole is formed to connect the vertical gate line and the fanout line by etching, which causes the problem of poor contact when the transition lines are connected.

Technical Solutions

To achieve above objects, the present disclosure provides a display panel having a display area and a non-display area around the display area.

The display panel further comprises a first metal layer, a first insulating layer, a second metal layer, a second insulating layer, a third metal layer, and a bridging layer.

The first metal layer has at least one first wire, wherein the first wire extends from the display area to the non-display area. The first insulating layer is disposed in the display area and the non-display area and covering the first metal layer, wherein the first insulating layer has at least one first through hole passing through the first insulating layer and extending to a surface of one of the at least one first wire. The second metal layer has at least one second wire, wherein each of the at least one second wire is disposed on the first insulating layer in the non-display area and correspondingly connects one of the at least one first wire through one of the at least one first through hole. The second insulating layer is disposed in the display area and the non-display area and covering the first insulating layer and the first metal layer. The second insulating layer has at least one second through hole passing through the second insulating layer and extending to a surface of one of the at least one second wire. The third metal layer has at least one third wire, wherein each of the at least one third wire is disposed on the second insulating layer in the non-display area. The bridging layer has at least one bridging wire, wherein each of the at least one one bridging wire extends from one of the at least one second wire in one of the at least one second through hole to one of the at least one the third wire corresponding to the one of the at least one the second wire.

Further, the display panel further comprises a passivation layer disposed between the second insulating layer and the bridging layer and covering the third metal layer.

Further, the passivation layer includes at least one third through hole and at least one fourth through hole. The third through hole passes through the passivation layer and corresponds to one of the at least one second through hole. The fourth through hole passes through the passivation layer and extends to a surface of one of the at least one third wire. The bridging wire passes through the third through hole from the second wire in the second through hole and extends to the third wire in the fourth through hole.

Further, the third through hole and the fourth through hole are located at one end of the non-display area near the display area, and the third through hole and the fourth through hole are spaced and arranged in a line.

Further, the first insulating layer further has at least one fifth through hole passing through the first insulating layer and extending to a surface of one of the at least one first wire. The second metal layer further has at least one fourth wire, each of the at least one fourth wire is disposed on the first insulating layer in the display area, each of the at least one fourth wire correspondingly passes through one of the at least one fifth through hole and connects one of the at least one first wire corresponding to the one of the at least one fifth through hole.

Further, a material of the bridging wire includes indium tin oxides.

The present disclosure further provides a preparing method for preparing the abovementioned display panel, comprising steps of:

Providing a substrate having a display area and a non-display area around the display area; forming a first metal layer on the substrate, and forming at least one first wire in the first metal layer, wherein the first wire extends from the display area to the non-display area; forming a first insulating layer on the substrate and the first metal layer, and forming at least one first through hole in the first insulating layer, wherein each of the at least one first through hole corresponds to one of the at least one first wire; forming a second metal layer on the first insulating layer, and forming at least one second wire in the second metal layer in the non-display area, wherein the second wire connects one of the at least one first wire through one of the at least one first through hole; forming a second insulating layer on the first insulating layer and the second metal layer, and forming at least one second through hole in the second insulating layer, wherein each of the first through hole corresponds to one of the at least one second wire; forming a third metal layer on second insulating layer on the non-display area, and forming at least one third wire in the third metal layer; and forming a bridging layer on the second insulating layer, and forming at least one bridging wire in the bridging layer, wherein the bridging wire extends from the second wire in the second through hole to the third wire corresponding to the second wire.

Further, the preparing method of the display panel further comprises a step of forming a passivation layer on the second insulating layer and the third metal layer.

Further, the preparing method of the display panel further comprises a step of forming at least one third through hole and at least one fourth through hole in the passivation layer, wherein each of the at least one third through hole corresponds one of the at least one first through hole, and each of the at least one fourth through hole corresponds to one of the at least one third wire.

Further, the step of forming a first insulating layer on the substrate and the first metal layer further comprises a step of forming at least one fifth through hole in the first insulating layer, wherein the fifth through hole corresponds to the first wire. The step of forming a second metal layer on the first insulating layer further comprises a step of forming at least one fourth wire on the first insulating layer in the display area while forming the second wire, wherein the fourth wire passes through the fifth through hole and connects the first wire corresponding to the fifth through hole.

Beneficial Effect

Advantages of the present disclosure are that: in the display panel provided by the present disclosure, second wires are disposed between two insulating layers, so as to connect first wires and bridging wires through the second wires to prevent the problem of stepped angles caused by an etching process between a first insulating layer and a second insulating layer, thereby preventing the bridging wires from poor contact and other problems, making the connection between the first wires and third wires more stable, and improving the reliability of the display panel. In addition, the preparing method of the display panel forms the second wires between the first insulating layer and the second insulating layer without adding new preparation steps, which improves the product yield and reduces the preparation costs.

Figure 1:
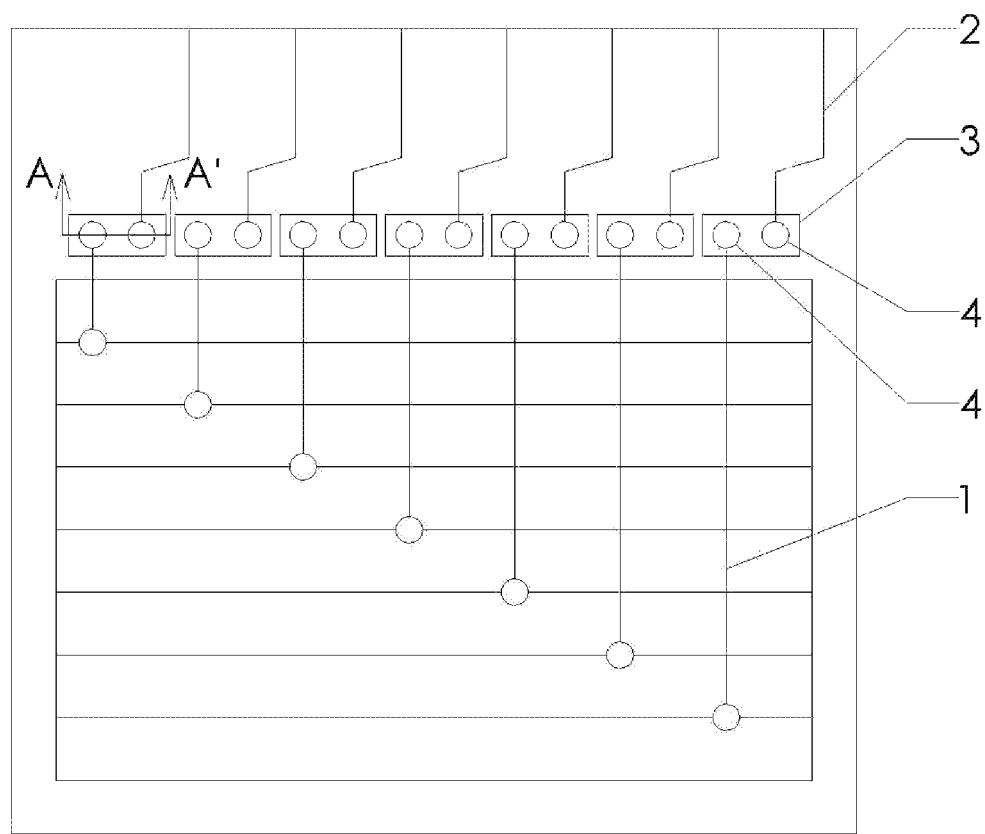
FIG. 1 is a schematic view of a wire arrangement in current display panel.
Figure 2:
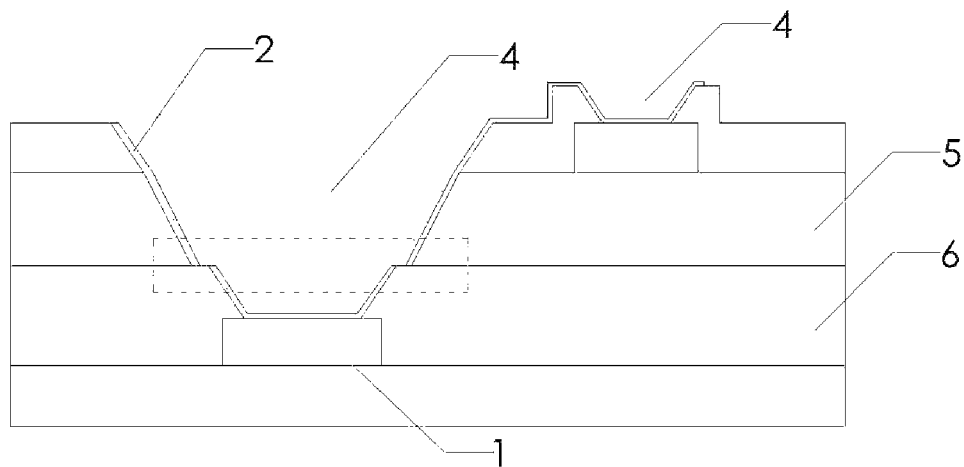
FIG. 2 is a cross-sectional view of the current display panel in FIG. 1 along a cutting line AA'.

The components in figures are represented as follows:
display panel 100;
display area 101; non-display area 102;
substrate 10; first metal layer 20; first wire 21;
first insulating layer 30; first through hole 31; fifth through hole 32;
second metal layer 40; second wire 41; fourth wire 42;
second insulating layer 50; second through hole 51;
third metal layer 60; third wire 61;
passivation layer 70; third through hole 71; fourth through hole 72;
bridging layer 80; bridging line 81;
vertical gate line 1; fanout line 2;
transition line 3; transition hole 4;
gate insulating layer 5, 6.

DETAILED DESCRIPTION OF PREFERRED EMBODIMENTS

Hereinafter, preferred embodiments of the present disclosure will be introduced with reference to the accompanying drawings of the specification to prove that the present disclosure can be implemented. The embodiments of the present disclosure can fully introduce the present disclosure to those skilled in the art, so that the technical content is clearer and easier to be understood. The present disclosure can be achieved by many different forms of embodiments, and the scope of the present disclosure is not limited to the embodiments mentioned in its context.

Figure 3:
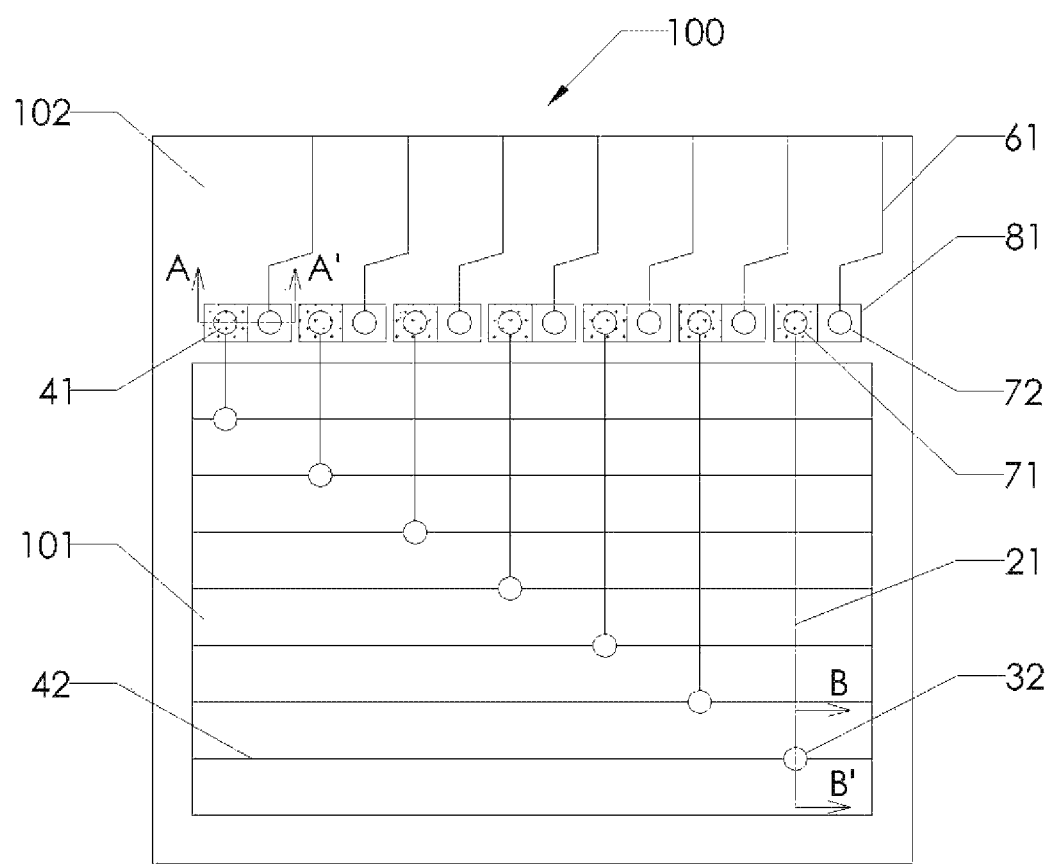
FIG. 3 is a schematic view of a wire arrangement in a display panel according to one embodiment of the present disclosure.
Figure 4:
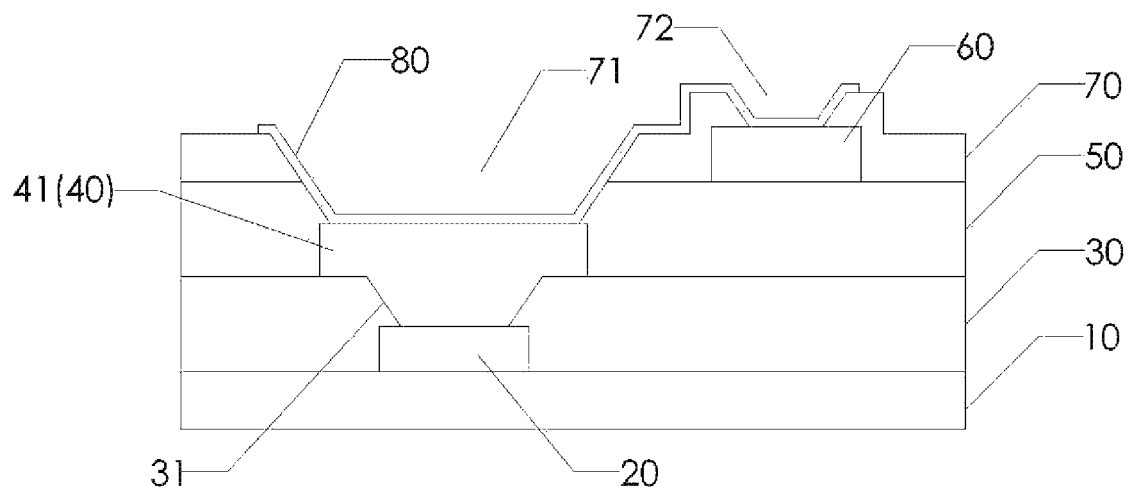
FIG. 4 is a cross-sectional view of the display panel shown in FIG. 3 taken along a cutting line AA'.
Figure 5:
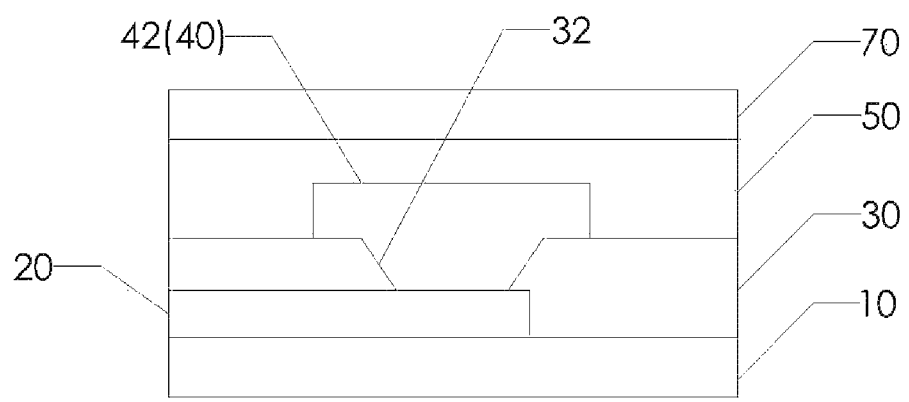
FIG. 5 is a cross-sectional view of the display panel shown in FIG. 3 taken along a cutting line BB'.

The present disclosure provides a display panel 100. As shown in FIG. 3, the display panel 100 includes a display area 101 and a non-display area 102 connecting the display area 101. The display area 101 is used for displaying images, and the non-display area 102 is used for arranging wires and connecting a corresponding driving circuit. As shown in FIG. 4 and FIG. 5, the display panel 100 further includes a substrate 10, a first metal layer 20, a first insulating layer 30, a second metal layer 40, a second insulating layer 50, a third metal layer 60, a passivation layer 70, and a bridging layer 80.

The substrate 10 is an insulating substrate, such as a glass substrate, and a quartz substrate.

The first metal layer 20 is disposed on a surface of the substrate 10 and includes several first wires 21. As shown in FIG. 3, the first wire 21 extends from the display area 101 of the display panel 100 to the non-display area 102. Adjacent two of the first wires 21 are insulated from each other.

The first insulating layer 30 is disposed on the substrate 10 and covers the first metal layer 20 to insultatively protect the wires in the first metal layer 20 to prevent the wires from short circuits, and also prevent the first metal layer 20 from being invaded by water and oxygen to cause corrosion.

As shown in FIG. 4, the first insulating layer 30 has several first through holes 31. The first through hole 31 passes through the first insulating layer 30 and extends to a surface of one of the first wires 21 of the first metal layer 20. The first through hole 31 is located in the non-display area 102, and one end of each of the first wires 21 located in the non-display area 102 is correspondingly provided with a first through hole 31.

As shown in FIG. 5, the first insulating layer 30 further comprises several fifth through holes 32. The fifth through hole 32 passes through the first insulating layer 30 and extends to a surface of one of the first wires 21 of the first metal layer 20. The fifth through hole 32 is located in the display area 101, and one end of each of the first wires 21 located in the display area 101 is correspondingly provided with a fifth through hole 32.

The second metal layer 40 is disposed on a surface of the first insulating layer 30 away from the first metal layer 20, and includes several second wires 41 and several fourth wires 42.

As shown in FIG. 3, the second wire 41 is located in the non-display area 102 of the display panel 100. The fourth wire 42 is located in the display area 101 of the display panel 100. Adjacent two of the second wires 41 are insulated from each other. One end of the first wire 21 located in the non-display area 102 connects one of the second wires 41 of the second metal layer 40, and another one end of the first wire 21 located in the display area 101 connects one of the fourth wires 42 of the second metal layer 40.

As shown in FIG. 4, the second wire 41 passes through a first through hole 31 corresponding to the second wire 41, and connects one of the first wires 21 of the first metal layer 20. As shown in FIG. 5, the fourth wire 42 passes through a fifth through hole 32 corresponding to the fourth wire 42, and connects one of the first wires 21 of the first metal layer 20.

The second insulating layer 50 is disposed on the first insulating layer 30 and covers the second metal layer 40 for insulating and protecting wires of the second metal layer 40 to prevent the wires from short circuits and also prevent the second metal layer 40 from being invaded by water and oxygen to cause corrosion.

As shown in FIG. 4, the second insulating layer 50 includes several second through holes 51. The second through hole 51 passes through the second insulating layer 50 and extends to a surface of one of the second wires 41 of the second metal layer 40. One end of the second through hole 51 is located in the non-display area 102 near the display area 101, and each of the second wires 41 is correspondingly provided with a second through hole 51.

The third metal layer 60 is disposed on a surface of the second insulating layer 50 away from the second metal layer 40, and includes several third wires 61. As shown in FIG. 3, the third wire 61 is located in the non-display area of the display panel 100, and adjacent two of the third wires 61 are insulated from each other.

The passivation layer 70 is disposed on the second metal layer 40 and covers the third metal layer 60 for insulating and protecting wires of the third metal layer 60 to prevent the wires from short circuits and also prevent the third metal layer 60 from being invaded by water and oxygen to cause corrosion.

As shown in FIG. 4, the passivation layer 70 includes several third through holes 71 and several fourth through holes 72. The third through hole 71 passes through the passivation layer 70 and is in communication with one of the second through hole 51 of the second insulating layer 50, and form a deep hole together with the second through hole 51. The fourth through hole 72 passes through the passivation layer 70 and extends to a surface of the third metal layer 60. As shown in FIG. 3, the third through hole 71 and the fourth through hole 72 are arranged in a line at one end of the non-display area 102 near the display area 101, and the third through hole 71 and the fourth through hole 72 are alternately arranged one by one.

The bridging layer 80 is disposed on the passivation layer 70 and includes several bridging wires. The bridging wires are made of a transparent conductive material such as indium tin oxides for electrically connecting the first wires 21 and the third wires 61.

As shown in FIG. 3, the bridging wire is located at one end of the non-display area 102 neat the display area 101. One end of the bridging wire passes through one deep hole formed by the second through holes 51 and the third through hole 71, and connects one of the second wires 41 of the second metal layer 40. Another one end of the bridging wire passes through one of the fourth through holes 72 adjacent to the third through hole 71, and connects one of the third wires 61 of the third metal layer 60. In addition, adjacent two of the bridging wires are insulated from each other.

As shown in FIG. 4, one end of the bridging wire passes through the second through hole 51 and the third through hole 71 to connect the second wire 41 of the second metal layer 40 corresponding to the bridging wire, and another end of the bridging wire passes through the fourth through hole 72 to connect the third wire 61 of the third metal layer 60 corresponding to the bridging wire.

The first wire 21 is a gate driving line, the second wire 41 is a metal connecting line, the third wire 61 is a fanout wire, and the fourth wire 42 is a gate wire. One end of the first wire 21 electrically connects the second wire 41, another end electrically connects one end of the third wire 61 through the second wire 41 and the bridging wire, and another end of the third wire 61 connects a gate driving circuit. When the display panel 100 is working, the gate driving circuit inputs scanning voltages to each of the first wires 21 through the third wire 61, and then the first wire 21 inputs the scanning voltage into the corresponding fourth wire 42 to perform scanning row by row, thereby turning on the thin film transistor of the display panel 100 row by row, so as to control the light emission of the display panel 100 to realize the display of images.

The present disclosure further provides a display device in one embodiment, and the display device includes the above-mentioned display panel 100 to provide display images for the display device. The display device may be any product or component with a display function, such as a mobile phone, a tablet computer, a notebook computer, etc.

In the display panel 100 provided in the embodiment of the present disclosure, the first wire 21 and the bridging wire are connected through the second wire 41, which reduces the depth of the deep holes in the first insulating layer 30 and the second insulating layer 50, and prevents problems of stepped angles caused by an etching process between the first insulating layer 30 and the second insulating layer 50, thereby preventing the bridging wire from poor contact and other problems, making the connection between the first wire 21 and the third wire 61 more stable, and improving the reliability of the display panel 100.

Figure 6:
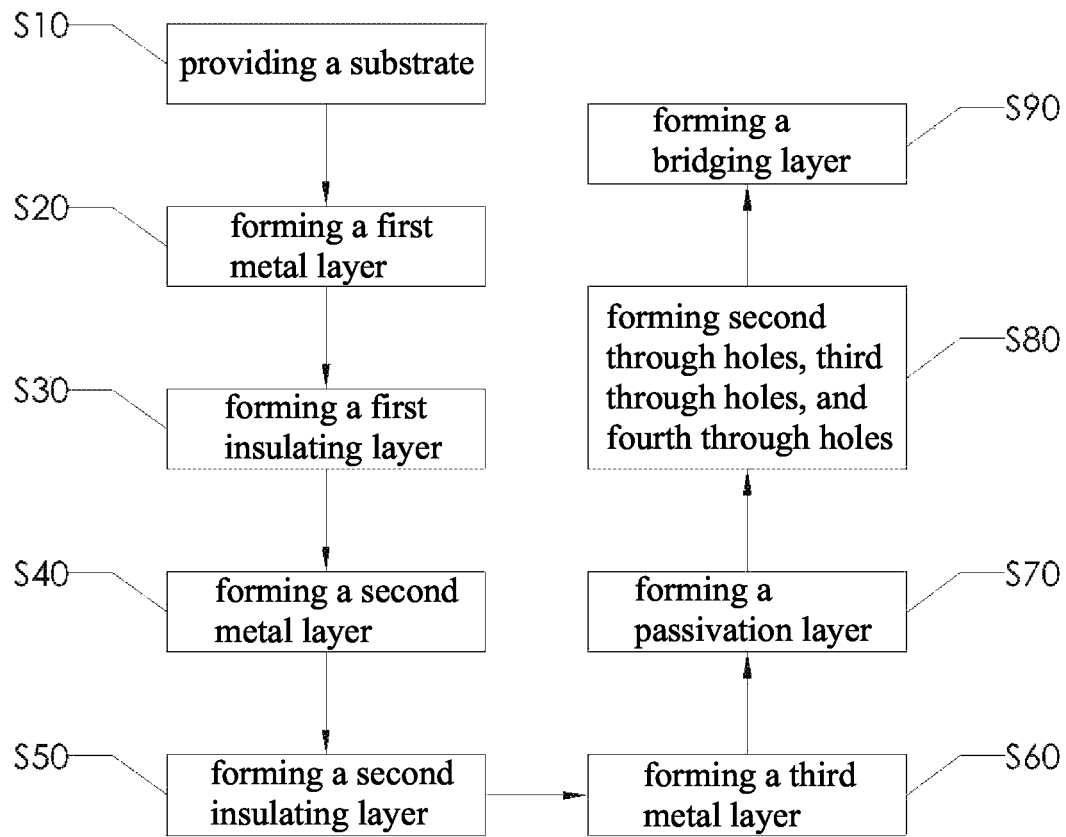
FIG. 6 is a flowchart of a preparing method of a display panel according to one embodiment of the present disclosure.

The present disclosure further provides a preparing method of the display panel 100 for preparing the above-mentioned display panel 100. The flowchart of the preparing method is shown in FIG. 6, including below preparing steps of:

Step S10: providing a substrate 10, wherein the substrate 10 is an insulating substrate having a display area 101 and a non-display area 102 around the display area 101.

Step S20: forming a first metal layer 20 by depositing a layer of metal material on a surface of the substrate 10 to form the first metal layer 20; and patterning the first metal layer 20 to form several first wires 21 in the display area 101, wherein the first wires 21 extend from the display area 101 to the non-display area 102.

Step S30: forming a first insulating layer 30 by depositing a layer of inorganic material such as silicon oxide and silicon nitride on the substrate 10, and covering the first wires 21 of the first metal layer 20 with the layer of inorganic material to form the first insulating layer 30; patterning the first insulating layer 30 by exposure and etching through a photomask to form several first through holes 31 of the first insulating layer 30 in the non-display area 102 and several fifth through holes 32 of the first insulating layer 30 in the display area 101, wherein each of the first wires 21 has two ends provided with a first through hole 31 and a fifth through hole 32, respectively.

Figure 7:
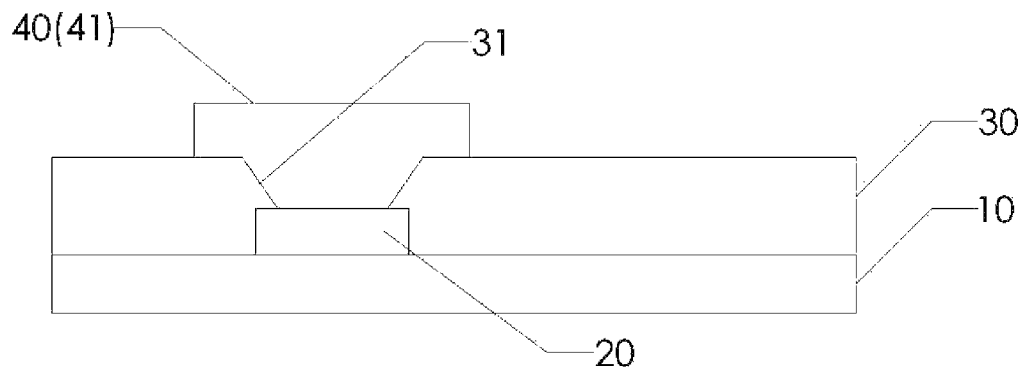
FIG. 7 is a cross-sectional view of the display panel in step S40 according to one embodiment of the present disclosure.

Step S40: forming a second metal layer 40 by depositing a layer of metal material on a surface of the first insulating layer 30 away from the first metal layer 20 to fill each of the first through hole 31 and the fifth through hole 32 of the first insulating layer 30 with the layer of metal material to form the second metal layer 40; pattering the second metal layer 40 through the yellow light process to form several second wires 41 on the first insulating layer 30 in the non-display area 102 (as shown in FIG. 7), and form several fourth wires 42 on the first insulating layer 30 in the display area 101; wherein each of the second wires 41 passes through a first through hole 31 and connects one of the first wires 21 corresponding to the first through hole 31, and each of the fourth wires 42 passes through a fifth through hole 32 and connects one of the first wires 21 corresponding to the fifth through hole 32.

Step S50: forming a second insulating layer 50 by depositing a layer of inorganic material such as silicon oxide and silicon nitride on the first insulating layer 30 to cover the second wires 41 and the fourth wires 42 of the second metal layer 40 with the layer of inorganic material to form the second insulating layer 50.

Step S60: forming a third metal layer 60 by depositing a layer of metal material on a surface of the second insulating layer 50 away from the second metal layer 40 to form the third metal layer 60; patterning the third metal layer 60 to form several third wires 61 on the second insulating layer 50 in the non-display area 102, wherein the third wires 61 extend from one side of the non-display area 102 near the display area 101 to one side of the display area 101 away from the display area.

Figure 8:
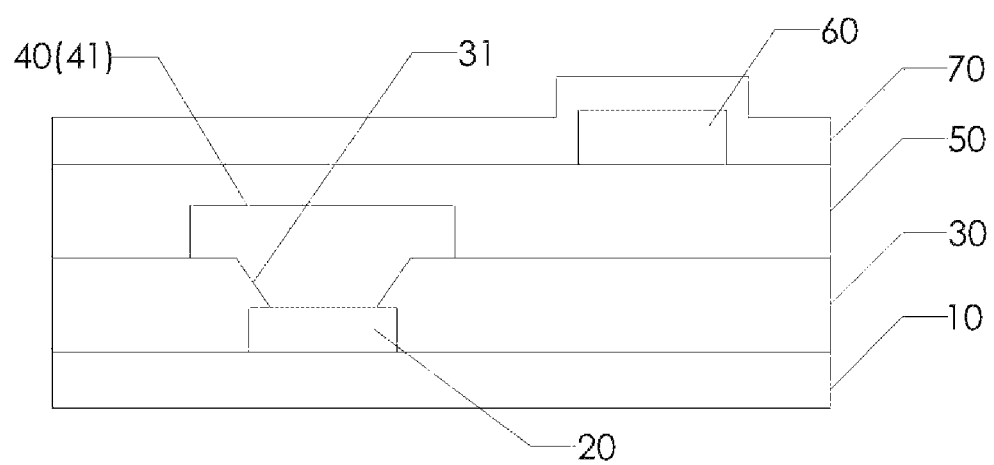
FIG. 8 is a cross-sectional view of the display panel in step S80 according to one embodiment of the present disclosure.

Step S70: forming a passivation layer 70 as shown in FIG. 8 by depositing a layer of inorganic material on the second insulating layer 50 and covering the third wires 61 of the third metal layer with the layer of inorganic material to form the passivation layer 70.

Figure 9:
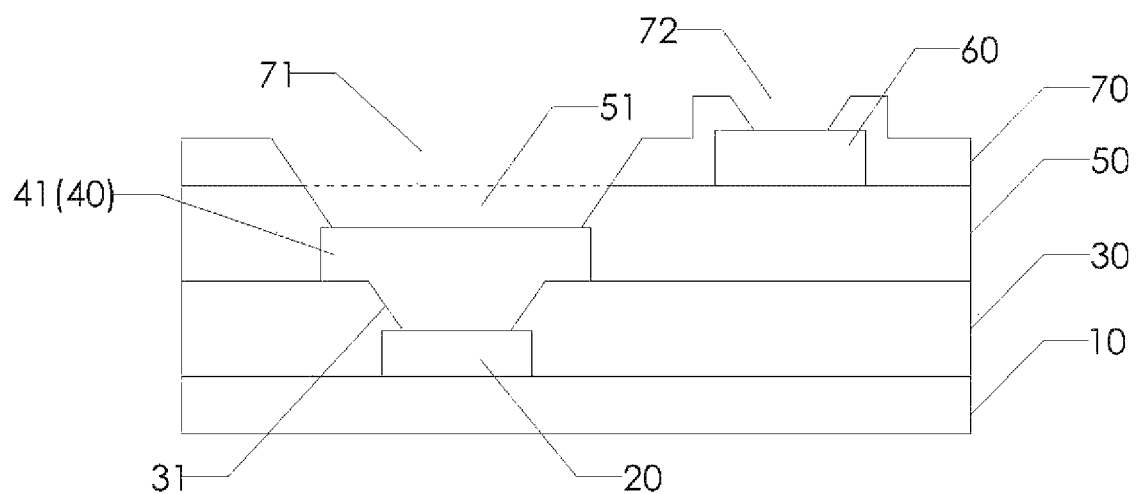
FIG. 9 is a cross-sectional view of the display panel in step S90 according to one embodiment of the present disclosure.

Step S80: forming second through holes 51, third through holes 71, and fourth through holes 72 as shown in FIG. 9 by etching to form several third through holes 71 and several fourth through holes 72 in the passivation layer 70 in the non-display area 102, and several second through holes 51 in the second insulating layer 50; wherein the second through hole 51 and the third through hole 71 are concentric holes, and the second through hole 51 and the third through hole 71 both correspond to one of the second wires 41 of the second metal layer 40, and the fourth through hole 72 corresponds to one of the third wires of the third metal layer 60.

Step S90: forming a bridging layer 80, including steps of depositing a layer of indium tin oxide on the passivation layer 70 to form the bridging layer 80; and patterning the bridging layer 80 to form several bridging wires in the non-display area 102 of the display panel 100, wherein the bridging wires extend from a surface of the second wires 41 corresponding to one of the second through holes 51 to a surface of the third wire 61 corresponding to one of the fourth through holes 72 so as to finally form the display panel 100 as shown in FIG. 4.

By adding second wires 41 on the second insulating layer 50, the display panel 100 prepared by the preparing method provided by the embodiment of the present disclosure has an improved reliability, and the yield rate of the display panel 100 is improved and the production cost is reduced without increasing production process and equipment.

Although the present disclosure is described herein with reference to specific embodiments, it should be understood that the embodiments are merely examples of the principles and applications of the present disclosure. Accordingly, it should be understood that many modifications can be made to the exemplary embodiments, and other arrangements can be devised as long as they do not deviate from the spirit and scope of the present disclosure as defined by the appended claims. It should also be understood that different dependent claims and features described herein can be combined in ways different from those described in the original claims. Furthermore, it is understandable that the features described in combination with a single embodiment can be applied to other embodiments.

What is claimed is:

1. A display panel having a display area and a non-display area around the display area, comprising:
    a first metal layer having at least one first wire, wherein the first wire extends from the display area to the non-display area;
    a first insulating layer disposed in the display area and the non-display area and covering the first metal layer, wherein the first insulating layer has at least one first through hole passing through the first insulating layer and extending to a surface of one of the at least one first wire;
    a second metal layer having at least one second wire, wherein each of the at least one second wire is disposed on the first insulating layer in the non-display area and correspondingly connects one of the at least one first wire through one of the at least one first through hole;
    a second insulating layer disposed in the display area and the non-display area and covering the first insulating layer and the first metal layer, wherein the second insulating layer has at least one second through hole passing through the second insulating layer and extending to a surface of one of the at least one second wire;
    a third metal layer having at least one third wire, wherein each of the at least one third wire is disposed on the second insulating layer in the non-display area; and
    a bridging layer having at least one bridging wire, wherein each of the at least one bridging wire extends from one of the at least one second wire in one of the at least one second through hole to one of the at least one the third wire corresponding to the one of the at least one the second wire, wherein the first insulating layer further has at least one fifth through hole passing through the first insulating layer and extending to a surface of one of the at least one first wire; and the second metal layer further has at least one fourth wire, each of the at least one fourth wire is disposed on the first insulating layer in the display area, each of the at least one fourth wire correspondingly passes through one of the at least one fifth through hole and connects one of the at least one first wire corresponding to the one of the at least one fifth through hole.

2. The display panel according to claim 1, further comprising:

a passivation layer disposed between the second insulating layer and the bridging layer and covering the third metal layer.

3. The display panel according to claim 2, wherein the passivation layer includes:

at least one third through hole passing through the passivation layer and corresponding to one of the at least one second through hole; and at least one fourth through hole passing through the passivation layer and extending to a surface of one of the at least one third wire;

wherein the bridging wire passes through the third through hole from the second wire in the second through hole and extends to the third wire in the fourth through hole.

4. The display panel according to claim 3, wherein the third through hole and the fourth through hole are located at one end of the non-display area near the display area, and the third through hole and the fourth through hole are spaced and arranged in a line.

5. The display panel according to claim 1, wherein a material of the bridging wire includes indium tin oxides.

6. A preparing method of a display panel, comprising steps of:

providing a substrate having a display area and a non-display area around the display area;

forming a first metal layer on the substrate, and forming at least one first wire in the first metal layer, wherein the first wire extends from the display area to the non- display area;

forming a first insulating layer on the substrate and the first metal layer, and forming at least one first through hole in the first insulating layer, wherein each of the at least one first through hole corresponds to one of the at least one first wire;

forming a second metal layer on the first insulating layer, and forming at least one second wire in the second metal layer in the non-display area, wherein the second wire connects one of the at least one first wire through one of the at least one first through hole;

forming a second insulating layer on the first insulating layer and the second metal layer, and forming at least one second through hole in the second insulating layer, wherein each of the first through hole corresponds to one of the at least one second wire;

forming a third metal layer on second insulating layer on the non-display area, and forming at least one third wire in the third metal layer; and forming a bridging layer on the second insulating layer, and forming at least one bridging wire in the bridging layer, wherein the bridging wire extends from the second wire in the second through hole to the third wire corresponding to the second wirer wherein the step of forming a first insulating layer on the substrate and the first metal layer further comprises a step of:

forming at least one fifth through hole in the first insulating layer, wherein the fifth through hole corresponds to the first wire; and the step of forming a second metal layer on the first insulating layer further comprises a step of:

forming at least one fourth wire on the first insulating layer in the display area while forming the second wire, wherein the fourth wire passes through the fifth through hole and connects the first wire corresponding to the fifth through hole.

7. The preparing method of a display panel according to claim 6, further comprising a step of:

forming a passivation layer on the second insulating layer and the third metal layer.

8. The preparing method of a display panel according to claim 7, further comprising a step of:

forming at least one third through hole and at least one fourth through hole in the passivation layer, wherein each of the at least one third through hole corresponds one of the at least one first through hole, and each of the at least one fourth through hole corresponds to one of the at least one third wire.

* * * * *